C. R. RITTER.
AUTOMOBILE LOCK.
APPLICATION FILED APR. 9, 1920.
1,359,433. Patented Nov. 16, 1920.
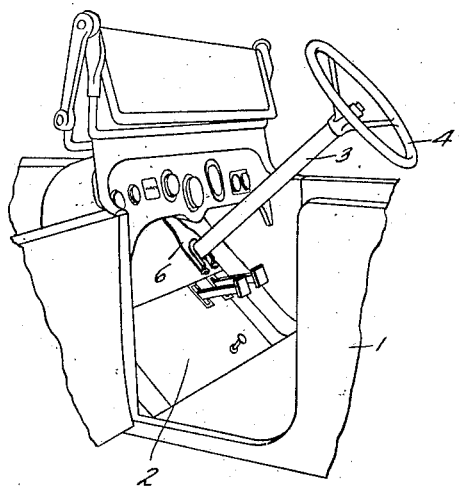
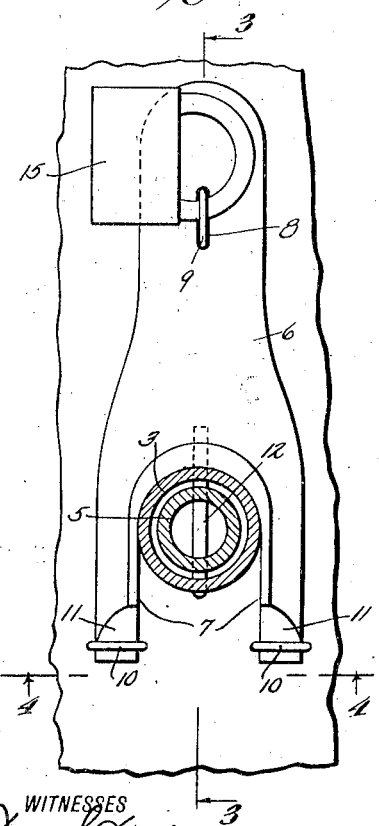
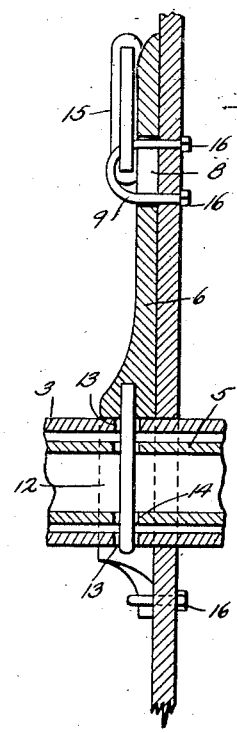
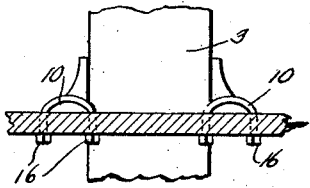
INVENTOR
C. R. RITTER,
BY Munn & Co.
ATTORNEYS

UNITED STATES PATENT OFFICE.

CHARLES RUFUS RITTER, OF FREEPORT, ILLINOIS.

AUTOMOBILE-LOCK.

1,359,433.  Specification of Letters Patent.  Patented Nov. 16, 1920.

Application filed April 9, 1920. Serial No. 372,448.

*To all whom it may concern:*

Be it known that I, CHARLES R. RITTER, a citizen of the United States, and a resident of Freeport, in the county of Stephenson and State of Illinois, have invented a new and Improved Automobile-Lock, of which the following is a full, clear, and exact description.

This invention relates to improvements in automobile locks, an object of the invention being to provide improved means for locking the steering post against rotary movement so that it is impossible to steer the automobile, and hence, impossible to operate or drag the car away until the steering post is released.

A further object is to provide a simple, inexpensive form of lock which can be utilized in connection with any ordinary automobile and which will most efficiently perform the functions for which it is intended.

With these and other objects in view the invention consists in certain novel features of construction, and combinations and arrangements of parts, as will be more fully hereinafter described and pointed out in the claim.

In the accompanying drawings—

Figure 1 is a fragmentary perspective view illustrating my improved device in operation;

Fig. 2 is a fragmentary plan view showing the steering column and post in section;

Fig. 3 is a view in section on the line 3—3 of Fig. 2;

Fig. 4 is a view in section on the line 4—4 of Fig. 2.

1 represents an automobile having the ordinary foot board 2 to which a steering column 3 is secured or through which it projects, and 4 is the steering wheel located at the upper end of the column 3 and secured to the steering post 5.

The turning operation of the steering wheel and the post 5 operates to change the angle of the front wheels to guide or steer the automobile as is well-known in the art. It is the purpose of my invention to provide a lock, which will, when in position, prevent turning movement of the steering post so that when a car is at rest and the wheels turned at an angle, the steering post can be secured against movement and locked in such position to prevent theft of the car.

My improved lock comprises a plate 6 having a forked or bifurcated end 7 adapted to straddle the column 3 as clearly shown in Fig. 2. This plate 6 is made near one end with a slot 8 to receive a staple 9 fixed to the foot board 2, and a pair of staples 10 are secured to the foot board and receive the beveled or tapering members 11 at the forked end 7 of the plate.

A longitudinally projecting locking pin 12 is secured to the plate 6 and is located centrally of the forked end 7. This pin 12 is adapted to be projected through registering openings 13 and 14 in column 3 and steering post 5 respectively, as clearly shown in Figs. 2 and 3, so that when the pin is in position, the steering post is locked against turning movement. A padlock 15 is provided and is adapted to be located through the staple 9 and secure the plate 6 against removal by an unauthorized person.

To render the device secure, I preferably make the staples 9 and 10 in the form of U-bolts with nuts 16 securing them in place.

The operation is as follows: When it is desired to lock the automobile, the steering wheel 4 is operated to turn the wheels at an angle, such as is common when the automobile is brought to a rest. The forked end 7 of the plate 6 is then positioned on the column with the members 11 located in the staples 10 and the pin 12 in the openings 13 and 14 respectively of the column and the steering post. The openings 13 and 14 are in the form of slots to allow for a certain angular disposition of the plate so as to allow the same to move on and off of the staple 9, and when in position on the staple 9 and the pin in the openings 13 and 14, the padlock 15 is placed in locked engagement with the staple 9 and prevents removal of the locking device except by the owner with the proper key.

Various slight changes might be made in the general form and arrangement of parts described without departing from the invention, and hence I do not limit myself to the precise details set forth, but consider myself at liberty to make such changes and alterations as fairly fall within the spirit and scope of the appended claim.

I claim:

The combination with an automobile having a footboard, a steering column projecting upwardly from the footboard, and a steering post in the column, said post and column having registering openings, of a locking device comprising a plate having a forked end adapted to straddle the column, a pin located centrally in the forked end and adapted to be positioned through the openings of the column and the post, devices on the footboard receiving the two members of the forked end of the plate holding them against upward movement, a hasp on the footboard, said plate having a slot therein receiving the hasp, and said hasp adapted to receive a lock to secure the plate in locked engagement with the column and the steering post.

CHARLES RUFUS RITTER.